US012747914B2

(12) United States Patent
Rauh et al.

(10) Patent No.: US 12,747,914 B2
(45) Date of Patent: Sep. 29, 2026

(54) DENTAL FURNACE AND METHOD FOR OPERATING A DENTAL FURNACE

(71) Applicant: VITA ZAHNFABRIK H. RAUTER GMBH & CO. KG

(72) Inventors: Wolfgang Rauh, Bad Säckingen (DE); Peter Arnold, Bad Säckingen (DE)

(73) Assignee: VITA ZAHNFABRIK H. RAUTER GMBH & CO. KG, Bad Säckingen (DE)

( * ) Notice: Subject to any disclaimer, the term of this patent is extended or adjusted under 35 U.S.C. 154(b) by 718 days.

(21) Appl. No.: 18/005,700

(22) PCT Filed: Aug. 31, 2021

(86) PCT No.: PCT/EP2021/074029
§ 371 (c)(1),
(2) Date: Jan. 17, 2023

(87) PCT Pub. No.: WO2022/058161
PCT Pub. Date: Mar. 24, 2022

(65) Prior Publication Data
US 2023/0280094 A1 Sep. 7, 2023

(30) Foreign Application Priority Data
Sep. 15, 2020 (EP) .................................... 20196289

(51) Int. Cl.
*F27B 17/02* (2006.01)
*A61C 13/20* (2006.01)
(Continued)

(52) U.S. Cl.
CPC ............ *F27B 17/025* (2013.01); *A61C 13/20* (2013.01); *F27D 11/02* (2013.01); *F27D 19/00* (2013.01); *F27D 2019/0003* (2013.01)

(58) Field of Classification Search
CPC .. F27D 11/02; F27D 19/00; F27D 2019/0003; F27D 2019/0037;
(Continued)

(56) References Cited

U.S. PATENT DOCUMENTS 6,043,465 A 3/2000 Anderson et al.
6,252,202 B1 * 6/2001 Zychek ................. F27B 17/025 219/390
(Continued)

FOREIGN PATENT DOCUMENTS

DE 1498822 A1 5/1971
DE 1498822 B1 * 5/1971
(Continued)

OTHER PUBLICATIONS

International Search Report dated Oct. 26, 2021 for PCT application No. PCT/EP2021/074029.
(Continued)

*Primary Examiner* — Hung D Nguyen
(74) *Attorney, Agent, or Firm* — Ohlandt, Greeley and Perle, LLP

(57) ABSTRACT

A dental furnace for firing dental-ceramic compounds, comprising a combustion chamber for receiving ceramic elements to be fired. The heating of the combustion chamber is carried out using a heating device. The heating device is connected to an evaluation device via a resistance measuring device. The temperature in the combustion chamber and/or an operating state of the dental furnace can be determined using the evaluation device.

17 Claims, 1 Drawing Sheet

(51) Int. Cl.
*F27D 11/02* (2006.01)
*F27D 19/00* (2006.01)

(58) Field of Classification Search
CPC ......... A61C 13/00; A61C 13/08; A61C 13/12; A61C 13/20; A61C 7/145; A61C 7/146; A61C 7/16; F27B 17/00; F27B 17/02; F27B 17/025; F27B 5/14; G01K 7/00; G01K 7/02
See application file for complete search history.

(56) References Cited

U.S. PATENT DOCUMENTS

| | | | | |
|---|---|---|---|---|
| 8,019,761 | B2 * | 9/2011 | Uehara | G06F 16/56<br>707/602 |
| 8,890,036 | B2 * | 11/2014 | Serrago | F27B 5/04<br>219/390 |
| 2004/0247013 | A1 * | 12/2004 | Clark | A61C 13/20<br>374/1 |
| 2008/0237211 | A1 * | 10/2008 | Jussel | A61C 13/20<br>219/390 |
| 2009/0225806 | A1 * | 9/2009 | Lorunser | F27B 17/025<br>373/134 |
| 2010/0213185 | A1 * | 8/2010 | Miller | F27D 99/0006<br>433/32 |
| 2014/0113237 | A1 * | 4/2014 | Rohner | F27B 5/14<br>219/390 |
| 2022/0276003 | A1 | 9/2022 | Jussel et al. | |

FOREIGN PATENT DOCUMENTS

| | | | |
|---|---|---|---|
| DE | 1498822 | U | 5/1971 |
| DE | 10211108991 | A1 | 2/2013 |
| DE | 102011108991 | A1 | 2/2013 |
| EP | 3760956 | A1 | 1/2021 |
| WO | 2017-121616 | A1 | 7/2017 |
| WO | 2021-001561 | A1 | 1/2021 |

OTHER PUBLICATIONS

Australian Office Action dated Apr. 15, 2026 for Australian Appl. No. 2021343724.

* cited by examiner

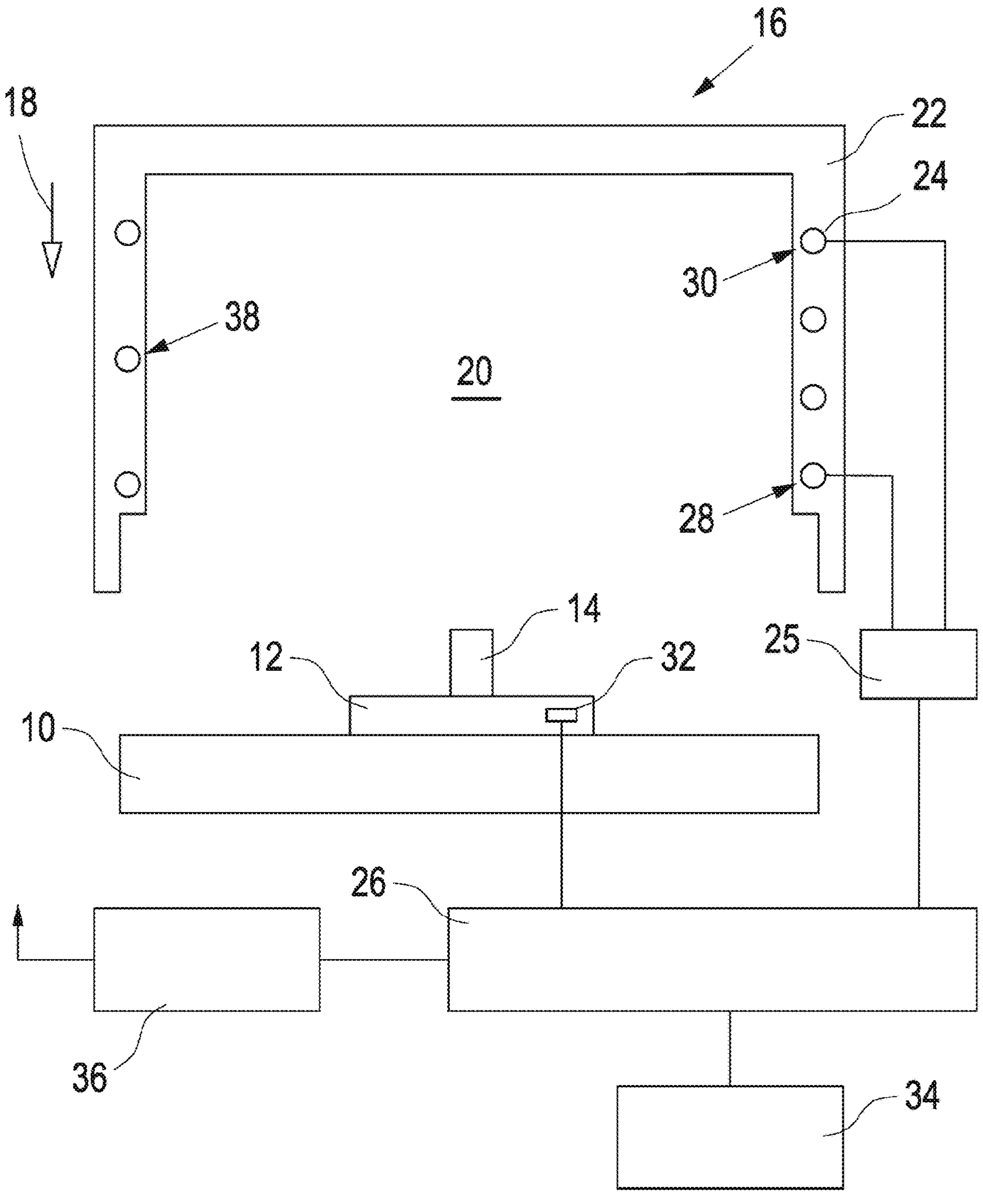
16
18
22
24
30
38
20
28
14
12
32
25
10
26
36
34

DENTAL FURNACE AND METHOD FOR OPERATING A DENTAL FURNACE

BACKGROUND

1. Field of the Disclosure

The disclosure relates to a dental furnace for firing dental ceramic compounds as well as for firing dental ceramic compounds onto dental alloys, zirconium oxide and/or other ceramic materials. The disclosure further relates to a method for operating such a dental furnace.

2. Discussion of the Background Art

Known dental furnaces comprise a usually evacuable firing chamber for receiving ceramic elements to be fired. Further, for firing the ceramic elements, an electrical heating device is provided in the firing chamber for heating/firing ceramic element. Heating wires are known as an electrical heating device. Further, in known dental furnaces, a temperature sensor is provided in the firing chamber. For firing a ceramic element, the same is arranged on a base while the firing chamber is open. Before the furnace can be closed, the ceramic element must be pre-dried to ensure that the ceramic element is fired completely during firing. Otherwise, when firing the ceramic element, an outer layer would be fired and seal, while the inner core portion of the ceramic element is still moist and cannot be fired completely. This leads to cracks and thus to the destruction of the ceramic element.

After pre-drying, the firing chamber is closed. Here, it also has to be ensured that the temperature in the firing chamber is not too high before closing. After closing, a firing program is performed in which in particular heating curves are stored. Such dental furnaces have the disadvantage that expensive temperature sensors have to be arranged in the firing chamber to determine the temperature.

It is an object of the disclosure to provide a dental furnace for firing dental ceramic compounds, in which a temperature sensor arranged directly in the firing chamber is not required. Further, it is an object of the disclosure to provide a method for operating such a dental furnace.

SUMMARY

The dental furnace according to the disclosure comprises an electrical heating device for heating/firing the ceramic element. According to the disclosure, a resistance measuring device is connected to the electrical heating device. According to the disclosure, an evaluation device is connected to the resistance measuring device. By means of the latter, it is possible to determine a temperature prevailing in the firing chamber and/or to determine an operating state of the dental furnace. Here, the temperature can be determined, for example, based on the measured resistance, by comparison with stored reference values. Depending on the measured resistance, it is also possible to determine an operating state defined by comparison values. According to the disclosure, an expensive temperature sensor arranged directly in the firing chamber is not required.

Preferably, the resistance measuring device is connected to the heating device, in particular a heating wire that emits heat radiation. The connection is preferably effected at two different points in order to be able to determine the resistance that varies depending on the temperature of the heating wire.

In order to be able to perform a resistance measurement as precise as possible and thus to be able to exactly determine the temperature actually prevailing in the firing chamber, it is preferred that the two connection points are arranged at the two ends of the heating wire, i.e. in particular at the beginning and the end of the heating wire. Thus, the part of the heating wire that is relevant to or active in heating the firing chamber is arranged, preferably completely, between the two connection points. Thus, one of the two connection points may be arranged in the cover region or the upper region of the firing chamber and the other connection points may be arranged preferably at a lower region of the firing chamber, possibly at base level. This depends on the design and the arrangement of the heating wire in the firing chamber.

In addition, it is possible for a further improvement in measurement quality to provide one or a plurality of connection points also in a central region of the heating wire. All connection points are connected to the evaluation device, the evaluation device detecting or determining in particular a change in resistance.

The resistance measurement can also be used when radiant heaters are used as electrical heating elements that are arranged e.g. below the firing chamber cover. When using one or a plurality of radiant heaters as the heating means, it is preferred that the two electrical connection points of the heating device are used as the connection points with the resistance measurement device. These are, in particular, the two contacts of the radiant heater, by which the same is connected to the power source. In particular, a plurality of radiant heaters can also be used, e.g. in electrical series connection. The connection points for resistance measurement are arranged at the beginning of the conductor for the first radiant heater and at the end of the conductor of the last radiant heater, as well as between the plurality of heaters, if necessary.

In a particularly preferred development, a calibration of the resistance measurement is performed. This can be effected in particular by measuring the resistance of the heating wire at a known temperature. Due to the change in resistance, it is then possible to determine a change in temperature. For this purpose, a temperature measurement device is provided in a particularly preferred embodiment. The same is preferably provided in the area of the ceramic element to be fired, in particular in the base on which the ceramic element is placed. Further, the temperature sensor can be arranged such that it is removed after the temperature measurement and prior to performing the firing process, so that the temperature sensor can not be damaged by the high temperatures that prevail in the firing camber and also heat up the base. The evaluation device is connected, on the one hand, to the heating wire via the connection points in order to measure the resistance, and, in a preferred embodiment, is further connected to the temperature measurement device. It is thereby possible that the evaluation device can establish a relationship between the measured resistance and the measured temperature.

In a development of the dental furnace according to the disclosure, the evaluation device may further be connected to a data storage element. Measuring data, including the measuring times, can be stored therein in particular for a continuous evaluation. It is thereby possible, for example, to determine changes in the heating resistance and thus to determine the wear of the heating resistance.

In the method according to the disclosure, which is suited in particular for operating a dental furnace as described above, a resistance of the heating device is measured using a resistance measurement device. The measured resistance is transmitted to the evaluation device. It is also possible to transmit only individual values of the measurement to the evaluation device which then calculates the measured resistance therefrom. According to the disclosure, a temperature and/or an operating state are determined by the evaluation device based on the measured resistance or other measurement data.

As described above with reference to the dental furnace according to the disclosure, it is preferred that the evaluation device is calibrated. The calibration is performed in particular by establishing a relationship between a measured resistance and a measured temperature. In this regard, a temperature can be measured in particular before closing the dental furnace, in particular a temperature in the area of the base. At the same time, the resistance is measured, so that a simple calibration is possible.

Using the evaluation device, a temperature change can preferably be determined based on a measured resistance change. This can be done using stored tables, calculations and/or a corresponding calibration.

The measured resistance data, in particular the measured times, can be stored in a data storage element possibly provided. As such, it is possible to perform an evaluation based on these data. For example, the wear of the heating element can be determined based on the stored data.

Preferably, the resistance measurement is performed at least initially with the firing chamber open. For a further improvement of the calibration, it is preferred that a resistance measurement is also performed with the firing chamber closed.

Depending on the temperatures determined, process steps can be activated. These may be, for example, the opening or closing of the firing chamber.

Advantageous developments of the method according to the disclosure are described above with reference to the dental furnace.

In the following, the disclosure is described in more detail by means of a preferred embodiment with reference to the accompanying drawing.

BRIEF DESCRIPTION OF THE DRAWING

The FIGURE shows a highly simplified schematic sectional view of the dental furnace according to the dental furnace.

DETAILED DESCRIPTION OF THE PREFERRED EMBODIMENT

The dental furnace has a base element 10 on which a base 12 is arranged. The base 12 serves for arranging a schematically illustrated ceramic element 14 thereon. In the FIGURE, a housing 16 is arranged in the open position and can be displaced in the direction of an arrow 18 for closing, so that a firing chamber 20 is formed.

A heating device 24 arranged helically as a heating wire is schematically illustrated in the side wall 22 which is in particular cylindrical in shape.

For determining the resistance of the heating wire 24, an evaluation device 26 is connected to the heating wire at two connection points 28, 30. The connection points 28, 30 are arranged at the two ends of the heating wire or the heating elements 24, so that, for example, the connection point 28 is arranged at the beginning and the connection point 30 is arranged at the end of the part of the heating wire 24 that is relevant for heating the firing chamber 20.

A resistance measurement device 25 is connected to the connection points 28, 30. The resistance data determined by the resistance measurement device 25 are transmitted to the evaluation device 26. The resistance measurement device 25 can also be integrated in the evaluation device 26.

Furthermore, a further connection point 38 can be provided in particular in a central portion of the heating wire 24. The latter is in turn connected to the resistance measurement device 25.

By means of the evaluation device 26, a resistance of the heating wire 24 or a change in resistance can be determined. For calibration and thus for determining a defined temperature, a temperature sensor 32 is arranged within the base 12, which is also connected to the evaluation device 26.

The data determined in the evaluation device 26 are transmitted to a data storage element 34. By a corresponding evaluation of the data, it is possible, for example, to determine the wear of the heating wire. Further, the data determined by the evaluation device can be transmitted to a control device 36. The control device 36 may, for example, control an opening or closing of the housing 16.

The invention claimed is:

1. A dental furnace for firing dental ceramic compounds, comprising:

a combustion chamber for receiving ceramic elements to be fired, an electric heating device for heating/firing the ceramic elements, resistance measurement device connected to the heating device, wherein the resistance measurement device is connected to the heating device at least at two different connection points of the heating device and at least one further connection point in a central portion of the heating device, and an evaluation device for determining a temperature in the firing chamber and/or an operating state of the dental furnace, said evaluation device being connected to the resistance measurement device.

2. The dental furnace for firing dental ceramic compounds according to claim 1, characterized in that the heating device comprises a heating wire.

3. The dental furnace for firing dental ceramic compounds according to claim 2, wherein the connection points are arranged at the two ends of the heating wire.

4. The dental furnace for firing dental ceramic compounds according to claim 3, wherein one of the connection points is arranged at the beginning and the second connection point is arranged at the end of the heating wire.

5. The dental furnace for firing dental ceramic compounds according to claim 4, wherein it is particularly preferred that one of the connection points is provided in the ceiling area of the firing chamber.

6. The dental furnace for firing dental ceramic compounds according to claim 1, wherein the heating device comprises one or a plurality of radiant heaters in particular connected in series.

7. The dental furnace for firing dental ceramic compounds according to claim 1, wherein the at least one further connection point is provided between the two electrical connection points of the heating device, in particular between the connection point at the end of the heating wire.

8. The dental furnace for firing dental ceramic compounds according to claim 1, wherein the evaluation device determines a resistance change and/or that a temperature measurement device is provided in particular in the area of the ceramic elements to be fired.

9. The dental furnace for firing dental ceramic compounds according to claim 8, wherein the evaluation device is connected to the temperature measurement device and establishes a relationship between the measured resistance and the measured temperature.

10. The dental furnace for firing dental ceramic compounds according to claim 1, wherein the evaluation device is connected to a data storage element in which in particular measurement data can be stored, wherein the evaluation device compares measurement data in order to determine the wear of the heating device.

11. The method for operating a dental furnace according to claim 10, wherein a resistance change is measured and a temperature change is determined therefrom.

12. A method for operating a dental furnace according to claim 1, comprising the following steps:

measuring a resistance of the heating device using a resistance measurement from the resistance measurement device connected to two different connection points of the heating device and at least one further point in a central portion of the heating device, transmitting the measured resistance to the evaluation device and determining a temperature and/or an operating state by the evaluation device, wherein the evaluation device is calibrated by establishing a relationship between a measured resistance and a measured temperature.

13. The method for operating a dental furnace according to claim 12, wherein the measured resistance data are stored in the data storage elements in particular together with measuring times, wherein a wear of the heating element is determined in particular based on the stored data.

14. The method for operating a dental furnace according to one of claim 12, wherein the resistance measurement is performed with the firing chamber open.

15. The method for operating a dental furnace according to claim 12, wherein the resistance measurement and the characteristics calibration is performed with the firing chamber closed.

16. The method for operating a dental furnace according to claim 12, wherein subsequent process steps are controlled in dependence on the temperature determined.

17. The method for operating a dental furnace according to claim 16, wherein the sequential opening and closing of the firing chamber are controlled in dependence on the temperature determined.

* * * * *